(12) United States Patent
Ropponen

(10) Patent No.: US 8,113,228 B2
(45) Date of Patent: Feb. 14, 2012

(54) SUCTION VALVE

(75) Inventor: Vesa Ropponen, Punkalaidun (FI)

(73) Assignee: Polarteknik PMC Oy Ab, Huittinen (FI)

( * ) Notice: Subject to any disclaimer, the term of this patent is extended or adjusted under 35 U.S.C. 154(b) by 567 days.

(21) Appl. No.: 12/281,870

(22) PCT Filed: Mar. 6, 2006

(86) PCT No.: PCT/FI2006/000075
§ 371 (c)(1),
(2), (4) Date: Sep. 8, 2008

(87) PCT Pub. No.: WO2007/101901
PCT Pub. Date: Sep. 13, 2007

(65) Prior Publication Data
US 2009/0090419 A1    Apr. 9, 2009

(51) Int. Cl.
*F16K 1/12* (2006.01)
(52) U.S. Cl. ......... 137/220; 137/221; 137/490; 137/492
(58) Field of Classification Search .......... 137/219–221, 137/490, 492
See application file for complete search history.

(56) References Cited

U.S. PATENT DOCUMENTS

| 2,698,568 A * | 1/1955 | Jensen ............................ 454/70 |
| 3,888,280 A | 6/1975 | Tartaglia |
| 4,254,634 A * | 3/1981 | Akio et al. ...................... 62/217 |
| 6,695,007 B2 | 2/2004 | Vicars |

FOREIGN PATENT DOCUMENTS

| DE | 1775356 | 7/1971 |
| DE | 3210790 | 10/1983 |
| DE | 4023845 | 4/1992 |
| DE | 19721356 | 12/1998 |
| FI | 20041153 | 3/2006 |
| GB | 1552987 | 9/1979 |

* cited by examiner

*Primary Examiner* — Craig Schneider
(74) *Attorney, Agent, or Firm* — Stites & Harbison PLLC; Douglas E. Jackson

(57) ABSTRACT

A suction valve for a pipe line in which a medium flows is provided, whereby the flow can be closed and regulated and whereby back flow prevented. The suction valve includes a movable a closing mechanism (3) placed in a valve house (1), and an opposed counter face in the valve house. The closing mechanism (3) can be moved by the pressure of the medium flow by forming the closing mechanism (3) to be as piston parts or cylinder parts in a working cylinder. The pressure of the medium flow used for moving the closing mechanism (3) is led into the closing mechanism through an outlet valve (8,9,10), which outlet valve is fitted inside the closing mechanism (3).

6 Claims, 2 Drawing Sheets

SUCTION VALVE

FIELD OF THE INVENTION

The invention relates to a suction valve to be used in a pipe line intended for a flow medium, by which the flow can be closed, regulated and back flow prevented. The suction valve comprises a closing means including a movable closing part placed in a valve house, and for the closing part the closing means also includes a counter face in the valve house. The closing part can be moved by the pressure of the flow medium. Preferably the closing means is formed to be as piston parts or cylinder parts in a working cylinder. The valve is especially suited as a suction valve for screw and rotor compressors, since the suction valve causes only a small loss of flow, can be regulated, and closes as needed. By closing the suction valve, back flow from the compressor is prevented when the compressor stops.

BACKGROUND OF THE INVENTION

Previously known is, among others, a suction valve from U.S. Pat. No. 6,695,007, where the suction flow of the medium to the compressor keeps the valve open. When the flow reduces, or for instance, when the suction effect of the compressor lessens, the spring in the valve pulls the closing means against the seat surface and closes the valve. In such a spring-return valve, a little more suction pressure loss always builds up over time, but because of the suction flow, the valve-closing means is kept open. However, pressure loss builds up further, even if the spring would be, as to its counter force, quite weak. When rather big compressors are working almost day and night, so that there is a slight deterioration in the operating efficiency, and because of the noted suction valve with a weak spring, the suction valve becomes a large expense in the production of compressed air. In addition, it is difficult to regulate a suction valve returning by spring force into an intermediate position near the closing state in order to achieve the relief state of compressor. Thus, the deterioration occurs, the relief which must be done relative to closing of the valve, while the compressor is working, is either adding a spring back factor or otherwise moving the closing means with less force against the closing surface.

BRIEF SUMMARY OF THE INVENTION

In order to avoid the above presented disadvantages and to achieve by compressor use, as to its flow loss, a very small suction valve, a new suction valve intended for a medium flow is disclosed. This suction valve can be placed in a pipe line, and the closing means thereof, which can be moved by the pressure of the medium flow, is formed as a piston or a cylinder part in a working cylinder which operates by means of the pressure of the medium flow. The above presented invention is characterized in that the necessary pressure of the flow material is led into the closing means through an outlet valve fitted inside the closing means.

The advantage of the invention is that the keeping of the valve in the open position does not cause any flow loss by the valve. The valve remains open both due to its mass by force of gravity and by the compressor's suction pressure which pressure is allowed to impact in a cylinder space formed by closing means into a direction pulling the closing means into the open position. In operation, the compressor must only one time create the negative pressure led through the outlet valve into the cylinder space, and afterwards there is no loss in keeping the valve open. Control of the outlet valve fitted inside the closing means of the suction valve takes place with the pressure of the medium led to it. Closing and opening of the suction valve is controlled to take place by the pressurized available medium. Thus control takes place in spite of the compressor running. When the closing valve is as to its inlet opening installed upwards, the closing means facilitates by its own mass the opening of the suction valve. The closing means can also be regulated to any intermediate place between the close and open positions. The outlet valve motions from closed state to open state of the closing means can be made quite fast, since the pressure of the medium that presses the closing means to the closed position discharges fast through the outlet valve to the suction tube of the compressor. The suction valve causes very little pressure loss to the medium flow passing it, since it is possible to make the design of the incoming and exit sides very streamlined.

BRIEF DESCRIPTION OF THE DRAWINGS

In the following the invention is disclosed with reference to the enclosed drawing

DETAILED DESCRIPTION OF THE INVENTION

Figure 1:
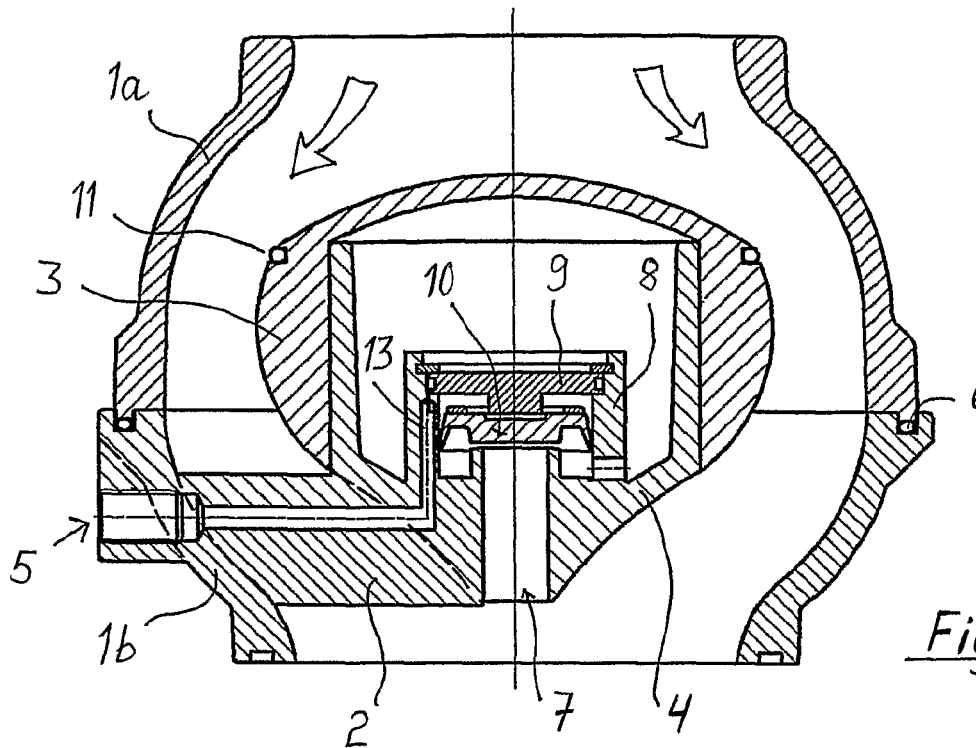
FIG. 1 shows a section view from the side of the valve according to the invention in the open position.
Figure 2:
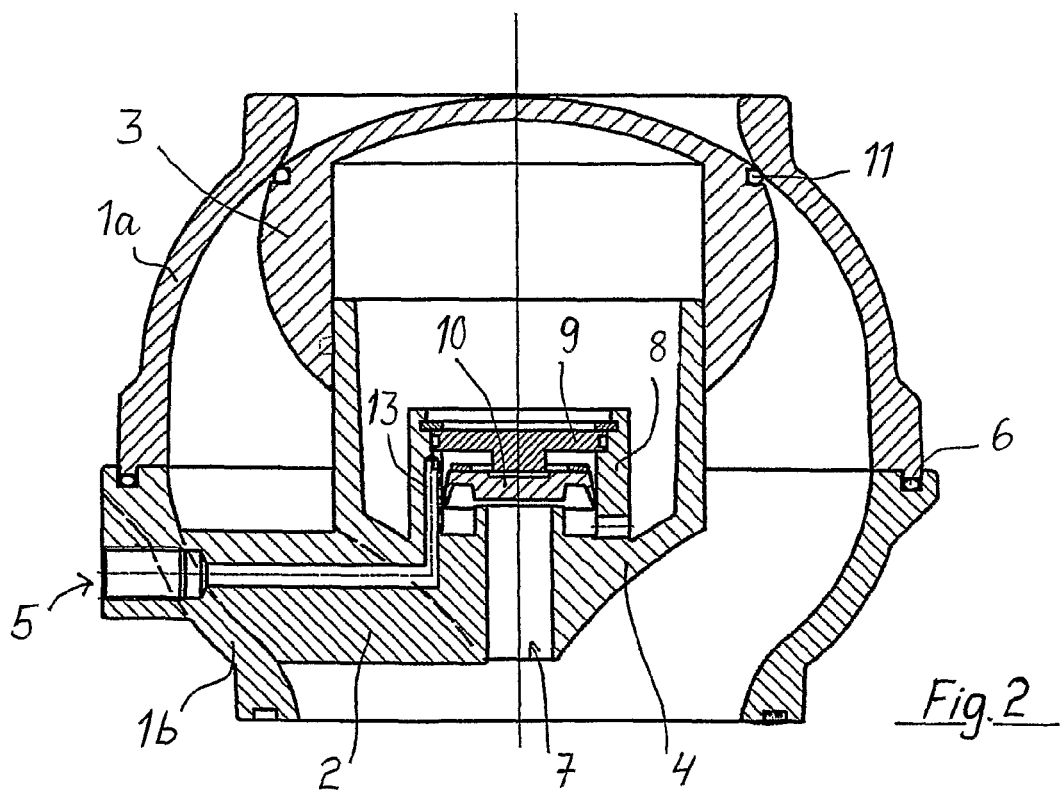
FIG. 2 shows the valve in a closed position.

FIG. 1 shows a suction valve, the outer casing of which is formed of two joined housing parts 1a and 1b, which can be attached to each other with bolts through holes 6 as shown. Connected and fixed to housing part 1b, by wing 2 led across the circular flow channel, is a fixed circular sleeve-like part 4 of a closing means for the suction valve. The outer surface of sleeve-like part 4 is fitted to work as a sliding surface together with a closing part 3. Closing part 3 and sleeve-like part 4 are like a cylinder and a piston, and thus they move in relation to each other. Closing part 3 is furnished with a packing 11, whereby when closing part 3 nestles in a closing position against the counter surface of housing part 1a as shown in FIG. 2, packing 11 is compressing in this closing position. Wing 2, which connects sleeve-like part 4 to housing part 1b, and housing part 1b is a little thicker in the connection area than in the remainder thereof, whereby it is possible to lead through housing part 1b at the connection area a channel 5 from the outside into the sleeve-like part 4.

An outlet valve is fixed inside sleeve-like part 4 by a threaded coupling. The outlet valve has a tap hole 7, which leads directly to the suction space of the compressor. Furthermore, the outlet valve comprises, in a cylindrical frame 8, a closing flange 10 which is made of a flexible material, such as polyurethane. To the frame 8, a supporting flange 9 is connected. The closing flange 10 closes tap hole 7, if the pressure behind the closing flange 10, led along channel 5 and further along suction line 13, is greater than the pressure in the tap hole 7. The pressure of the tap hole 7 dominates also inside closing part 3 and sleeve-like part 4 in the cylinder space formed thereby. In the open state described in the FIG. 1, no pressure is led through the channel 5 to the outlet valve. For instance, channel 5 can also be joined to the same pressure with the compressor suction side, in other words to a chamber into which the tap hole 7 discharges. The closing means stays in the state shown by FIG. 1, and does not try get closed. Thus the flow losses caused by the closing means are minimized.

The closed situation of FIG. 2 can be reached both on compressor stopping and working. For instance, from the compressor's pressure side, control pressure is led behind the closing flange 10 of the outlet valve, whereby this compressor pressure moves to close the tap hole 7. The flexible material of closing flange 10 gives in, so that pressure can get, by the way of the flexing outer edge of flange 10, into the cylinder space to circulate inside the closing part 3, and the pressure pushes the closing part 3 to closed position. Consequently, the compressor runs relieved or it is stopped. The pressure cannot get discharged backward off the compressor.

If it is desired to get the suction valve open, this happens very fast, since the control pressure of channel 5 which is led out is a very small amount of air. Then, in the cylinder space, the pressure from the inside of the closing part 3 is at once able to push closing flange 10 of the closing means a little away from the tap hole 7, whereby the pressure from the inside of the closing part 3 quickly discharges through the tap hole 7 into the suction space of the starting compressor and the closing flange 10 remains in the open position shown by FIG. 1. Inside the closing part 3, negative pressure sucked by the compressor arises, and the closing means move quickly to the open-position and the flow can pass through the suction valve. It will thus be appreciated that the running of the compressor or its starting accelerates the opening of the suction valve. Further, the opening of the suction valve is especially accelerated by the position of the suction valve, if it is according to the FIGS. 1 and 2, whereby the closing part 3 moves downward to open-position, assisted by the force of gravity.

It is also possible for the closing part 3 to be adjusted to intermediate positions. This is possible since the position of the quick outlet valve according to FIG. 2 can be moved by leading through channel 5 only a regulated amount of medium into the space formed between the closing part 3 and the sleeve-like part 4.

Figure 3:
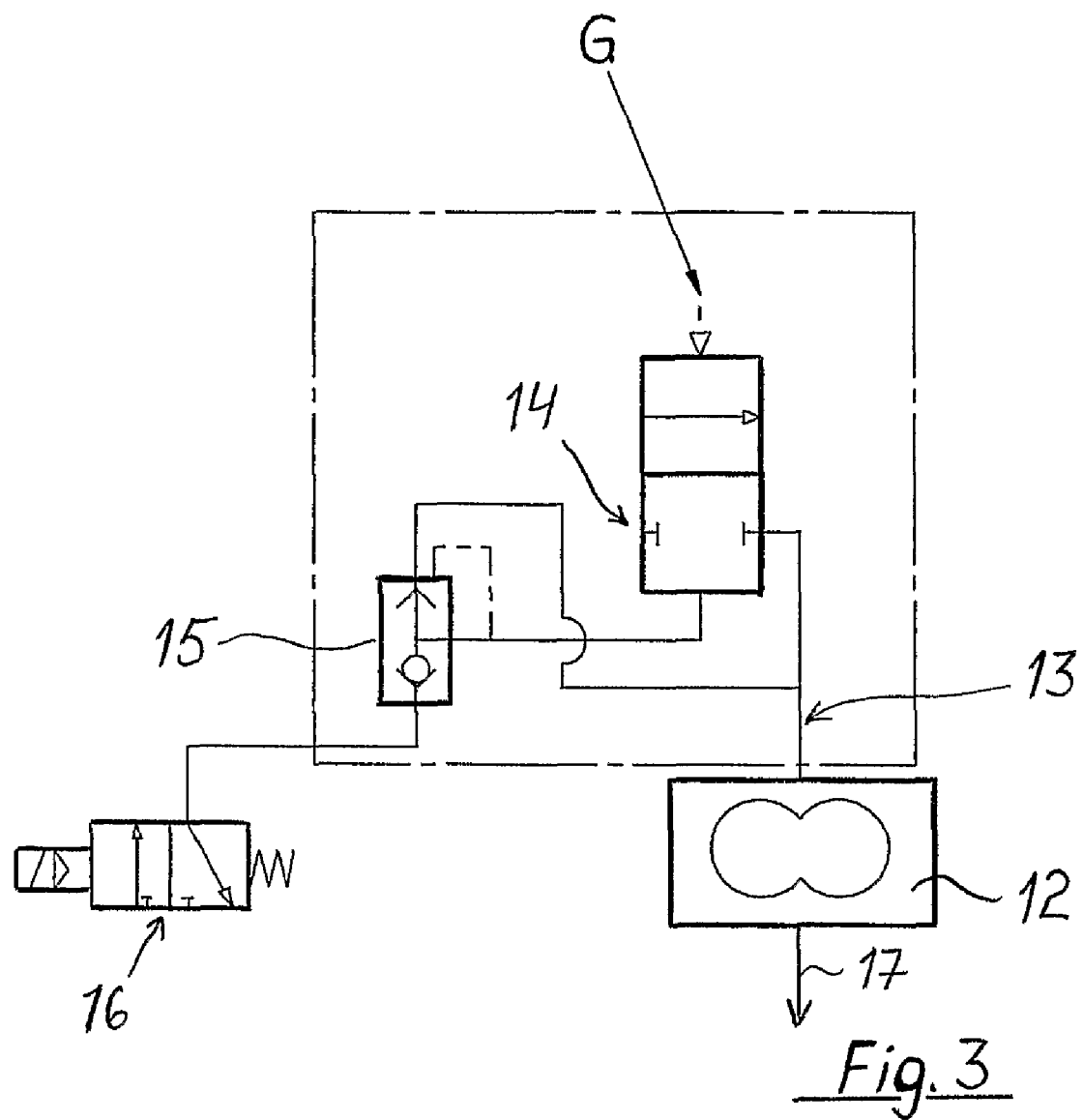
FIG. 3 shows the valve connection diagrammatically.

FIG. 3 shows the main diagram of the valve connections. Valve 14 is a suction valve, comprising in FIGS. 1 and 2 housing part 1a and closing part 3. Valve 15 is an outlet valve comprising in FIGS. 1 and 2 parts 8, 9 and 10. Valve 16 is a control valve, by the opening of which the pressure is led to the outlet valve 15 and this causes that the suction valve 14 to close in spite of the running of compressor 12. The control pressure runs through the outlet valve 15 into the closing means, and lifts up the closing flange 10 whereby the suction valve 14 closes. When the pressure control of the control valve 16 is removed, the low pressure or suction in the suction line 13 leading to the compressor removes pressure from the inside of the closing part 3 so that closing part 3 closes moves to the open position of the suction valve 14 shown in FIG. 1. The pressure line starting from compressor 12 has the reference number 17. The inlet opening of the suction valve 14 is shown in FIG. 3 opposite the outlet suction line 13. From compressor 12, pressure line 17 takes control pressure to the control valve 16. It is also possible to take control pressure from some other outside pressure source.

The invention claimed is:

1. A suction valve for a pipe line in which a medium flows, whereby the flow in the pipe line can be closed and can be regulated and whereby back flow can be prevented, the suction valve comprising:

a valve housing through which the medium flows, said valve housing including a counter seating face which surrounds an upstream portion of the medium flow in the valve housing and a stationary part in the valve housing;

a movable part which is placed in said valve housing and which is movable relative to said stationary part between a closed position where the movable part engages the counter face of the valve housing and prevents flow through said valve housing and an open position where flow through said valve housing is permitted, said stationary part and said movable part together forming a working cylinder of a piston part and a cylinder part with a working space therebetween so that said movable part can be moved by a downstream pressure of the flow medium being present or absent from the working space;

an outlet valve by which the downstream pressure of the flow medium is led into said working space, said outlet valve being located inside of the working space, and said outlet valve including a tap hole which is open to a downstream portion of the medium flow in the valve housing.

2. A suction valve according to claim 1, wherein by a selected use position of the suction valve, a force of gravity is utilized to move the movable part to the open position.

3. A suction valve according to claim 1, wherein said outlet valve further includes a closing flap which, when the downstream pressure of the flow medium is led to the outlet valve, closes the tap hole so that the movable part moves to the closed position.

4. A suction valve according to claim 1, wherein, when the movable part is in the closed position, a reduction of the downstream pressure of the flow medium led to the outlet valve causes the tap hole of outlet valve to open which results in the movable part moving from the closed to the open position.

5. A suction valve according to claim 1, wherein the movable part is a moving cylinder, which is movable relative to the stationary part which is a sleeve-like piston.

6. A suction valve according to claim 5, wherein the outlet valve is located inside of the sleeve-like piston.

* * * * *